Patented June 14, 1932

1,862,949

UNITED STATES PATENT OFFICE

JAN AL, OF AMSTERDAM, NETHERLANDS, ASSIGNOR TO DE BATAAFSCHE PETROLEUM MAATSCHAPPIJ, OF THE HAGUE, NETHERLANDS

PROCESS FOR MANUFACTURING NICKEL CATALYSTS

No Drawing. Application filed June 8, 1929, Serial No. 369,533, and in the Netherlands July 5, 1928.

This invention relates to the manufacture of nickel in a finely divided state, particularly for the catalytic manufacture of hydrogen from methane or other hydrocarbons and steam.

It is known that methane and other hydrocarbons can be converted into hydrogen and $CO_2$ with steam at high temperature under the influence of nickel as a catalyst.

Further it is known that the state of the catalyst has a great influence upon the reaction; that is to say, upon the yield of hydrogen. As a rule, a fine distribution of the catalyst has a favourable effect, but in addition to this, other factors appear to play a part which results from the manner in which the catalyst is manufactured.

A method has now been found for the manufacture of the nickel whereby an extremely active catalyst is obtained.

In principle my invention consists in treating a solution of a suitable nickel salt with a solution which is capable of converting the nickel salt into hydroxide, after which the hydroxide obtained is further converted into nickel by reduction with hydrogen. The invention is essentially characterized in that less than the theoretical quantity of said solution is used.

As a secondary advantage of working with less than the theoretical quantity of the said solution, the washing with water proceeds much quicker than when an excess of the solution is used.

Further it has been found of importance to carry out the reduction with hydrogen at a temperature of about 350° centigrade. If necessary the nickel catalyst can be applied together with a promoter.

Example 40 grammes nickel nitrate $(Ni(NO_3)_2\ 6\ aq)$ is dissolved in 600 cc. water.

This solution, into which, if necessary, the carrier can be put, is heated to about 40° centigrade and, while stirring, is precipitated with about 200 cc. of 5% NaOH solution in such a manner that the green colour of the dissolved nickel-salt is still clearly perceptible.

This is followed by filtering and washing, first with hot then with cold water.

The product obtained is reduced with hydrogen at 350° C.

With this catalyst, methane is converted with 2.1 times an excess of steam.

With 18 cc. contact volume (i. e., the apparent volume occupied by the catalyst), and a methane speed of 600 cc. per hour, by conducting the gas one time over the catalyst at 650° centigrade a gas mixture is obtained which, after condensation of the water and absorption of the carbon dioxide, contains 72.4% hydrogen.

The process of making hydrogen from hydrocarbons and steam with the aid of the nickel catalyst forms the subject of my copending application 495,531, filed Nov. 13, 1930, which is a division of the present application.

What I claim is:

1. The herein-described process of manufacturing a nickel catalyst in a finely divided state, comprising the steps of treating a nickel salt with a solution which will convert said salt into nickel hydroxide, and then further reducing the hydroxide into nickel by treating it with hydrogen; said process being essentially characterized in that less than the theoretical quantity of the aforesaid solution is used.

2. The herein-described process of manufacturing a nickel catalyst in a finely divided state, comprising the steps of treating a nickel salt with a solution which will convert said salt into nickel hydroxide, and then further reducing the hydroxide to nickel by treating it with hydrogen at high temperature; said process being essentially characterized in that less than the theoretical quantity of the aforesaid solution is used.

3. A process according to claim 1, in which the nickel salt consists of nickel nitrate.

In testimony whereof I have affixed my signature.

JAN AL.